United States Patent [19]

Huhman

[11] Patent Number: 4,906,218
[45] Date of Patent: Mar. 6, 1990

[54] DISTRIBUTION TROUGH EXTENSIONS FOR AGRICULTURAL HARVESTER

[75] Inventor: Michael L. Huhman, Mayville, Wis.

[73] Assignee: Deutz-Allis Corporation, Norcross, Ga.

[21] Appl. No.: 225,966

[22] Filed: Jul. 29, 1988

[51] Int. Cl.[4] ............................................. A01F 12/18
[52] U.S. Cl. ........................................ 460/69; 460/74; 460/101; 56/10.2
[58] Field of Search ................... 130/27 R, 27 T, 272, 130/DIG. 3, 27 Q; 56/10.2, 14.2; 460/10, 62, 69, 74, 101

[56] References Cited

U.S. PATENT DOCUMENTS

| | | | |
|---|---|---|---|
| 4,178,944 | 12/1979 | Hanaway | 130/27 R |
| 4,457,316 | 7/1984 | James | 130/27 T |
| 4,466,231 | 8/1984 | Rowland-Hill et al. | 130/27 R |
| 4,712,568 | 12/1987 | Strong et al. | 130/27 Z |
| 4,716,908 | 1/1988 | Helmes | 130/27 T |

*Primary Examiner*—William P. Neuder
*Attorney, Agent, or Firm*—Charles L. Schwab

[57] ABSTRACT

The threshed material passing through the foraminous cage and concave of the processor section of the combine falls by gravity to a distribution auger in a trough at the bottom of the processor housing. The threshed material passes through a slot in the trough to a pair of accelerator rolls which throw the threshed material downwardly to the cleaning section of the combine. In order to help the distribution auger to distribute the threshed material to the slot whereby the threshed material is spread along the trough and discharges at a relatively even flow rate along the length of the slot, one or two movable trough extensions are added to reduce the width of the slot along a portion of its length.

8 Claims, 2 Drawing Sheets

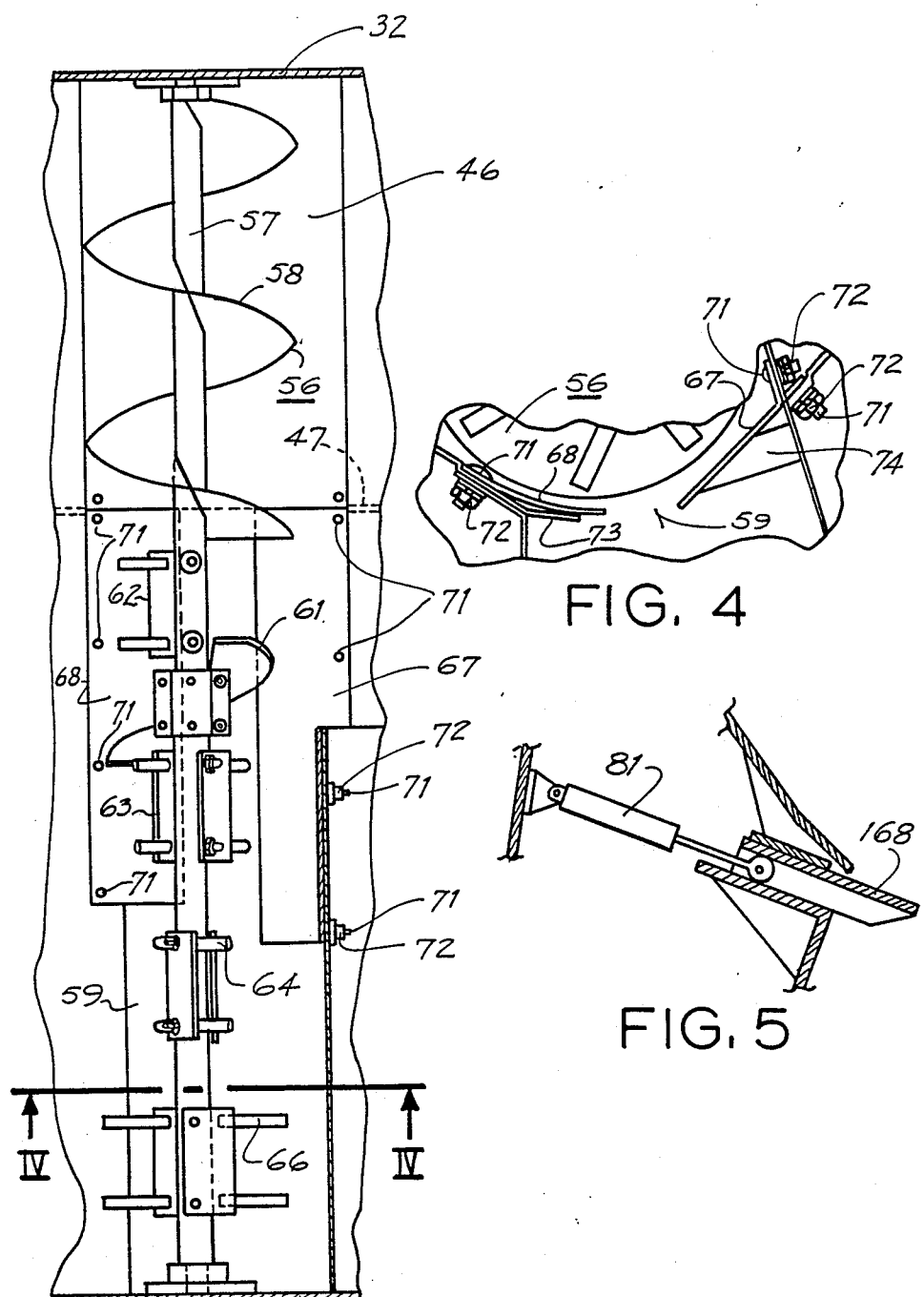

DISTRIBUTION TROUGH EXTENSIONS FOR AGRICULTURAL HARVESTER

TECHNICAL FIELD

This invention relates to an agricultural harvester of the type having a processor housing with a trough at the bottom into which threshed material falls by gravity from a foraminous cylindrical cage surrounding a threshing rotor and more particularly relates to means for improving the flow of threshed material through a slot in the trough en route to a pair of accelerator rolls.

PRIOR ART STATEMENT

U.S. Pat. No. 4,457,316 issued July 3, 1984 to Larry R. James for an Axial Flow Combine With Single Distribution Auger shows a combine having an axial flow processor with a threshing rotor in a cylindrical foraminous cage which in turn is housed in a processor housing having a trough at its bottom in which a distribution auger rotates to distribute material to a discharge slot in the trough. The discharge slot is substantially the same length as the accelerator rolls positioned beneath the slot and the slot is of uniform width. U.S. Pat. No. 4,466,447 issued Aug. 21, 1984 to W. A. Hoefer and G. W. Busboom for a Tailings Return to Threshing Section or to Cleaning Section shows a processor housing having two troughs at its bottom in which two augers rotate and a discharge slot between the troughs.

OBJECTS AND SUMMARY OF THE INVENTION

The primary object of this invention is to improve the flow and distribution of threshed material to the accelerator rolls of an agricultural harvester.

It is a further object of this invention to provide means to reduce the width of a portion of the discharge slot in the trough at the bottom of the processor housing so as to more evenly distribute threshed material fed to the accelerator rolls, thereby improving the harvesting efficiency and capacity of the harvester.

It is also an object of this invention to provide means by which the operator may selectively adjust the width of a portion of the discharge slot in the trough of the processor housing.

This invention provides a means for improving the distribution of threshed material to the accelerator rolls of an agricultural harvester. The harvester or combine in which this invention is used includes a crop header mounted on the front of the combine main frame, a processor for threshing and separating the grain from harvested crop and a cleaning section. The processor includes a housing with front and rear walls, side walls and sloping walls converging downwardly from the front and rear walls and forming a horizontal and transversely extending trough at the bottom of the housing. The processor also includes a foraminous cylindrical cage extending between the side walls, a threshing rotor rotatably mounted on the side walls and disposed within the cage and in coaxial relation to the latter. The processing housing extends laterally beyond one lateral side of the cleaning section and a transversely extending slot is formed in the portion of the trough lying above the cleaning section. A pair of accelerator rolls are disposed below the slot so as to receive threshed material falling through the slot. The accelerator rolls throw the threshed material downwardly to the cleaning section through a rearward discharge of air from a blower. A distribution auger rotatably supported on the processor housing side walls is operatively positioned in the trough and includes a spiral flight operable to move threshed material from the portion of the trough extending beyond the cleaning section to the slot. A movable trough extension releasably secured to the trough at one side of the slot serves to reduce the width of part of the slot and thereby improve the distribution of threshed material to the accelerator rolls.

The trough extension may be shiftably mounted on the processor housing and selectively adjusted by power means to change the width of the slot.

BRIEF DESCRIPTION OF THE DRAWINGS

The invention, as incorporated in a combine, is illustrated by the drawings, in which:

FIG. 3 is a view taken on the line III—III in FIG. 2;

FIG. 4 is a view taken on the line IV—IV in FIG. 3; and

FIG. 5 is a section view showing a power adjusted trough extension.

DETAILED DESCRIPTION OF THE DRAWINGS

Figure 1:
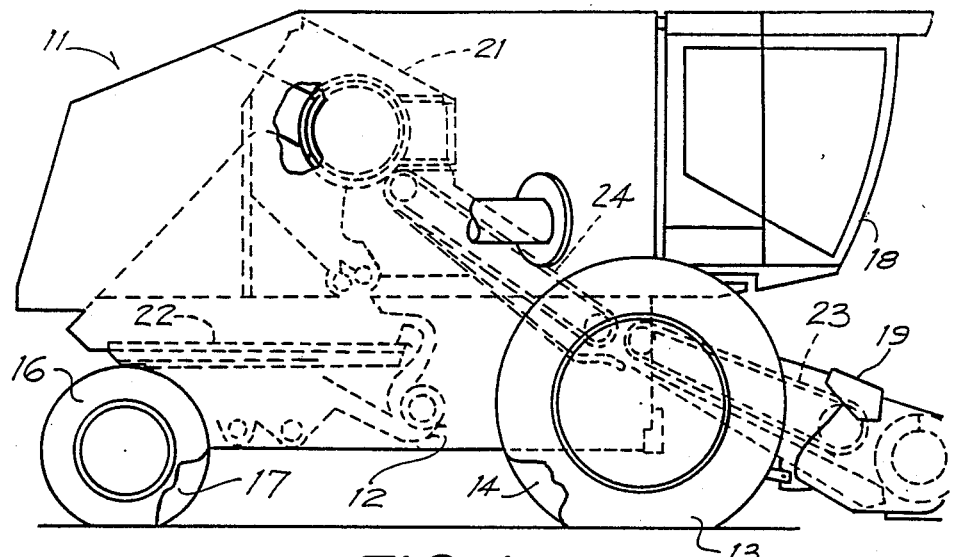
FIG. 1 is a side view of a combine with parts broken away for illustration purposes.
Figure 2:
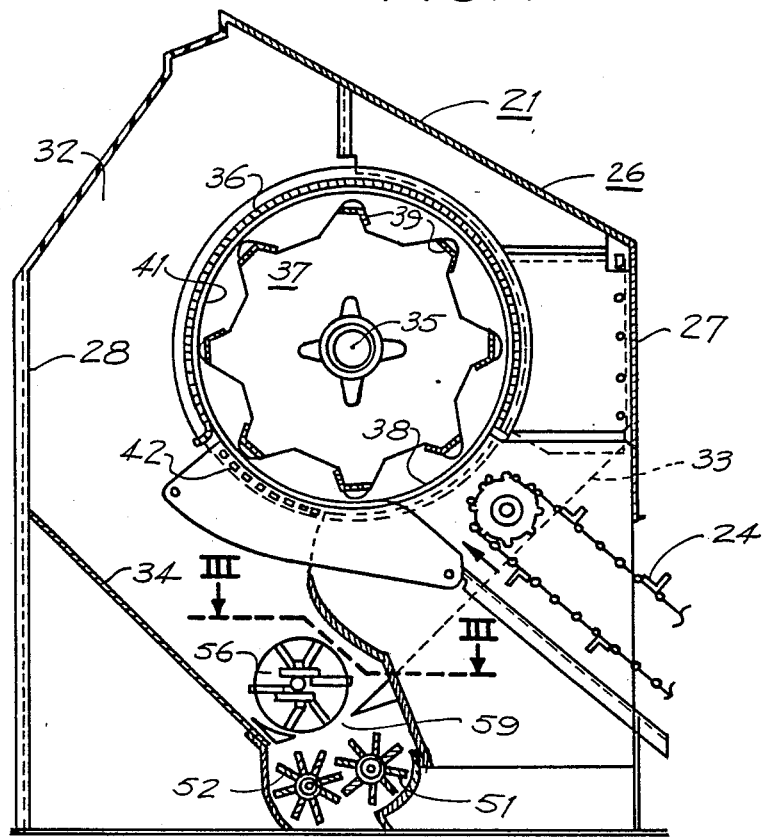
FIG. 2 is a section view of the processor section of the combine of FIG. 1.

Referring to FIGS. 1 and 2, the invention is particularly useful in a self-propelled harvester or combine 11 having a main frame 12 supported by a pair of front driving wheels 13, 14 and a pair of steerable rear wheels 16, 17. The combine includes an operator's cab 18, a vertically adjustable crop header 19, a crop processor 21 and a cleaning section 22. Crop material is conveyed rearwardly from the header 19 to the processor 21 by feeder conveyors 23, 24.

Referring to FIGS. 2 and 3, the crop processor 21 includes a housing 26 having a front wall 27, a rear wall 28, laterally opposite side walls 31, 32 and a pair of sloping walls 33, 34 converging downwardly from the front and rear walls 27, 28. A cylindrical foraminous cage 36 extends between and is secured to the side walls 31, 32 and a threshing rotor 37 is coaxially disposed within the cage 36 and is supported on the side walls 31, 32 for rotation about a horizontal transverse axis 35. The crop being harvested is delivered to the threshing rotor 37 through a cage inlet opening 38 near one axial end of the cage 36. The rasp bars 39 impact on the incoming crop material which is moved axially toward the other axial end of the cage 36 by spiral ribs 41 on the inward facing cylindrical surface of the cage 36. Grain or seed separated by the threshing action passes through the radial openings in the cage 36 and through the convave 42, falls onto the sloping walls 33, 34 and slides downwardly to a horizontal and transversely extending trough 46 connected to the bottom of the sloping walls 33, 34.

The cleaning section 22 of the combine extends laterally between side wall 31 and an intermediate vertical wall 47. Thus, a portion of the processor housing 26, and its trough 46, extends laterally beyond the cleaning section 22 and beyond the accelerator rolls 51, 52 extending across the width of the cleaning section 22. A distribution auger 56 is operatively disposed in the trough 46 and includes a shaft 57 rotatably supported at its opposite ends on the side walls 31, 32. The auger 56 is driven by the combine engine, not shown, and as it rotates a main flight 58 moves the threshed material from the portion of the trough 46 extending laterally beyond the wall 47 of the cleaning section 22 to a transversely extending slot 59. The flight 58 slightly overlaps the end of the slot 59 near the overhanging part of the processor housing 26. The auger 56 also includes a short flight 61 of less than 360 degrees spaced axially from main flight 58 and radially extending finger attachments 62, 63, 64, 66 releasably secured to the shaft 57. It will be noted that the short flight 61 is positioned axially between finger attachments 62 and 63 and is disposed above the portion of the slot 59 narrowed by the extensions 67, 68 which will be more fully discussed in the following description.

In order to provide a better distribution of threshed material across the length of the accelerator rolls 51, 52 and across the width of the cleaning section, movable trough extensions 67, 68 are secured to the processor housing 26 by releasable fastening means in the form of bolts 71 and nuts 72. The trough extension 68 includes a reinforcing angle 73 welded to its underside and the trough extension 67 includes a brace 74 welded to its underside. The extensions 67, 68 in spaced but juxtaposed relation to one another serve to narrow a portion of the slot nearest the overhanging part of the processor housing 26 thereby causing more of the threshed material to fall to the accelerator rolls 51, 52 through the wide portion of the slot. In some crop harvesting conditions the trough extensions, together with the auger 56, serve to more evenly distribute the flow of threshed material to the accelerator rolls and cleaning section. However, in other harvesting situations one or both of the trough extensions may not be required or even desirable. As is obvious from the drawings, one or both of the extensions can be easily removed by removing the bolts 71 and nuts 72 which secure them to the processor housing 26.

As shown in FIG. 5, the trough extension 68 may be replaced by a power adjustable trough extension 168 which is operated by power means in the form of a double acting hydraulic jack 81. When the linear jack 81 is extended to its illustrated position the extension 168 is shifted to its extended position and the trough slot is narrowed and when the jack is contracted the extension 168 is shifted to its retracted position and the slot is opened to its full width. Thus, the power adjustable trough extension of FIG. 5 permits the operator to selectively control the trough slot width from the operator station 18 through use of well known hydraulic controls, not shown.

The embodiments of the invention in which an exclusive property or priveledge is claimed are defined as follows:

1. A self-propelled agricultural harvester having a frame, a crop header on the front of said frame for receiving crop, a processor on said frame for threshing said crop and for separating grain therefrom, said processor including a housing having front and rear walls, a pair of transversely spaced vertical side walls, a pair of sloping walls converging downwardly from said front and rear walls and forming a horizontal and transversely extending trough at the bottom of said housing, a foraminous cylindrical cage extending between said side walls, a threshing rotor rotatably mounted on said side walls and disposed coaxially within said cage on a transverse horizontal axis, a cleaning section disposed beneath part of said housing, said processor housing extending laterally beyond one side of said cleaning section a substantial distance, a transversely extending slot in the bottom of said trough in the portion of the latter disposed above said cleaning section and extending lengthwise across the transverse width of said cleaning section, a pair of accelerator rolls on parallel transverse axes disposed below said slot for receiving and accelerating threshed material, including grain, downwardly to said cleaning section, a distribution auger in said trough rotatably supported on and extending between said transversely spaced vertical side walls including at least one sprial flight operable to move threshed material from the portion of said trough extending beyond the cleaning section to said slot in said trough and a trough extension mounted on said processor housing at one of the front and rear sides of said slot reducing the width of only a portion of said slot, said trough extension extending transversely a predetermined distance from that end of the cleaning section beyond which the processor housing extends to an intermediate point in the length of the slot, whereby the remainder of the length of said slot is of a greater width than said portion of said slot.

2. The harvester of claim 1 and further comprising a second trough extension mounted on said processor housing at the other of said front and rear sides of said slot in generally juxtaposed relation to but spaced from said extension at said one side of said slot whereby the width of said slot is further reduced.

3. The harvester of claim 2 wherein at least one of said trough extensions is retractible by power means to selectively vary the width of said slot.

4. The harvester of claim 2 wherein said trough extensions are secured to said processor housing by releasable fastening means.

5. The harvester of claim 1 wherein said trough extension is retractible by power means to selectively vary the width of said slot.

6. The harvester of claim 1 wherein said trough extension is secured to said processor housing by releasable fastening means.

7. The harvester of claim 1 wherein said flight on said distribution auger terminates near said one side of said cleaning section, and said distribution auger includes a shaft and a plurality of axially spaced finger attachments secured to and extending radially outward from said shaft on the portion of the latter disposed above said slot.

8. The harvester of claim 7 wherein said distribution auger includes a short spiral flight segment of less than 360 degrees secured to said shat in an axial space between two finger attachments and vertically above the reduced width portion of said slot.

* * * * *

UNITED STATES PATENT AND TRADEMARK OFFICE
CERTIFICATE OF CORRECTION

PATENT NO. : 4,906,218

DATED : March 6, 1990

INVENTOR(S) : Huhman, Michael L.

It is certified that error appears in the above-identified patent and that said Letters Patent is hereby corrected as shown below:

Column 4, Line 58, cancel "shat" and substitute --- shaft ---

Signed and Sealed this

Ninth Day of April, 1991

*Attest:*

HARRY F. MANBECK, JR.

*Attesting Officer*  *Commissioner of Patents and Trademarks*